US010859222B2

(12) United States Patent
Hornbachner

(10) Patent No.: US 10,859,222 B2
(45) Date of Patent: Dec. 8, 2020

(54) SYSTEM FOR ILLUMINATING AN ENVIRONMENT

(71) Applicant: ICGH INVESTMENT AND CONSULTING GMBH, Vienna (AT)

(72) Inventor: Dieter Hornbachner, Vienna (AT)

(73) Assignee: ICGH INVESTMENT AND CONSULTING GMBH, Vienna (AT)

(*) Notice: Subject to any disclaimer, the term of this patent is extended or adjusted under 35 U.S.C. 154(b) by 154 days.

(21) Appl. No.: 16/303,711

(22) PCT Filed: May 19, 2017

(86) PCT No.: PCT/EP2017/062090
§ 371 (c)(1),
(2) Date: Nov. 21, 2018

(87) PCT Pub. No.: WO2017/202714
PCT Pub. Date: Nov. 30, 2017

(65) Prior Publication Data
US 2019/0301692 A1 Oct. 3, 2019

(30) Foreign Application Priority Data

May 23, 2016 (EP) .................................... 16170816

(51) Int. Cl.
*H02J 7/00* (2006.01)
*F21S 9/02* (2006.01)
(Continued)

(52) U.S. Cl.
CPC .............. *F21S 9/026* (2013.01); *B60L 53/30* (2019.02); *F21S 8/086* (2013.01); *F21S 9/03* (2013.01);
(Continued)

(58) Field of Classification Search
USPC .................................................. 320/101, 109
See application file for complete search history.

(56) References Cited

U.S. PATENT DOCUMENTS 4,200,904 A * 4/1980 Doan ...................... F21S 9/043
362/183
10,411,495 B2 * 9/2019 Tuerk ................ H02J 13/00006
(Continued)

FOREIGN PATENT DOCUMENTS

| AT | 514522 B1 | 3/2015 |
| CN | 2717093 Y | 8/2005 |

(Continued)

OTHER PUBLICATIONS

English Translation of International Preliminary Report on Patentability in corresponding International Application No. PCT/EP2017/062090.
(Continued)

*Primary Examiner* — Samuel Berhanu
(74) *Attorney, Agent, or Firm* — Hoffmann and Baron, LLP

(57) ABSTRACT

The present disclosed subject matter relates to an installation for illuminating an environment. The installation comprises a multiplicity of illumination devices which are distributed in the environment and approachable via a route network, wherein each illumination device has a light, a wind and/or solar module for respective generation of wind or solar electricity feeding the light, a buffer battery for respectively buffering the wind or solar electricity, and a charging input for charging the buffer battery; a common charging station for the illumination devices, which is approachable via the route network and has a charging output for outputting charging electricity; and a robot which travels self-sufficiently on the route network, has an accumulator and shuttles between a first position, in which it connects to the (Continued)

charging output of the charging station and buffers the charging electricity thereof in the accumulator, and multiple second positions, in each of which it connects to the charging input of an illumination device and charges the buffer battery thereof from the accumulator.

14 Claims, 2 Drawing Sheets

(51) Int. Cl.
*B60L 53/30* (2019.01)
*F21S 8/08* (2006.01)
*F21S 9/03* (2006.01)
*H02J 7/35* (2006.01)
*F21W 131/103* (2006.01)
*H02J 7/34* (2006.01)

(52) U.S. Cl.
CPC .......... *H02J 7/0013* (2013.01); *H02J 7/0027* (2013.01); *H02J 7/0044* (2013.01); *H02J 7/35* (2013.01); *F21W 2131/103* (2013.01); *H02J 7/342* (2020.01); *H02J 2207/40* (2020.01); *Y02B 20/72* (2013.01)

(56) References Cited

U.S. PATENT DOCUMENTS

| 2010/0013436 | A1* | 1/2010 | Lowenthal | B60L 53/64 |
| | | | | 320/109 |
| 2012/0229085 | A1* | 9/2012 | Lau | B60L 58/20 |
| | | | | 320/109 |
| 2013/0134938 | A1 | 5/2013 | Bianco | |
| 2014/0184141 | A1 | 7/2014 | Loftus et al. | |
| 2016/0014871 | A1 | 1/2016 | Dobbins | |

FOREIGN PATENT DOCUMENTS

| CN | 2718380 Y | 8/2005 |
| CN | 201100573 Y | 8/2008 |
| CN | 101527984 A | 9/2009 |
| CN | 201992554 U | 9/2011 |
| CN | 103915866 A | 7/2014 |
| CN | 203686846 | 7/2014 |
| CN | 104791696 A | 7/2015 |
| CN | 205017052 U | 2/2016 |
| DE | 102009006982 A1 | 8/2009 |
| EP | 1633029 A2 | 3/2006 |
| KR | 20150088983 | 8/2015 |

OTHER PUBLICATIONS

European Search Report dated Nov. 23, 2016.
International Preliminary Report on Patentability dated Apr. 13, 2018 in corresponding International Application No. PCT/EP2017/062090.
International Search Report dated Sep. 14, 2017.
Office Action and English translation thereof from corresponding Chinese Patent Application No. 201780031821.3, pp. 1-20, dated Jul. 22, 2020.

* cited by examiner

SYSTEM FOR ILLUMINATING AN ENVIRONMENT

CROSS-REFERENCE TO RELATED APPLICATIONS

This application is a National Phase application of International Application No. PCT/EP2017/062090 filed May 19, 2017 which claims priority to the European Patent Application No. 16170 816.9 filed May 23, 2016, the disclosures of which are incorporated herein by reference.

This disclosed subject matter relates to an installation for illuminating an environment, with a multiplicity of illumination devices which are distributed in the environment and approachable via a route network, wherein each illumination device has a light, a wind and/or solar module for respective generation of wind or solar electricity feeding the light, a buffer battery for respectively buffering the wind or solar electricity, and a charging input for charging the buffer battery.

When an illumination installation is first set up for a part of a city, a village, a park, etc., with conventional street lights, approximately two thirds of the investment costs are spent just for installing the cabling of the individual street lights. Therefore, it is very advantageous to use, instead of conventional wired lights, wind or solar lights, each of which can be operated self-sufficiently at the place it is set up with electricity from a wind or solar module. A buffer battery can store the solar electricity generated during the day or the wind electricity generated when there is wind for use at night or when there is no wind. However, reservations with regard to a sufficient energy balance stand in the way of widespread use of wind or solar light installations, especially outside of the sun belt, where the winter yield of solar modules is small, or in low-wind regions.

The disclosed subject matter has the goal of overcoming these disadvantages and creating an illumination installation with wind and/or solar lights, which can be reliably used even in low-wind areas or in areas outside of the sun belt.

This is accomplished with an installation of the type mentioned at the beginning, comprising a multiplicity of illumination devices which are distributed in the environment and approachable via a route network, wherein each illumination device has a light, a wind and/or solar module for respective generation of wind or solar electricity feeding the light, a buffer battery for respectively buffering the wind or solar electricity, and a charging input for charging the buffer battery, which installation is characterised according to the disclosed subject matter in that it further comprises:

a common charging station for the illumination devices, which is approachable via the route network and has a charging output for outputting charging electricity, and a robot which travels self-sufficiently on the route network, has an accumulator and shuttles between a first position, in which it connects to the charging output of the charging station and buffers the charging electricity thereof in the accumulator, and multiple second positions, in each of which it connects to the charging input of an illumination device and charges the buffer battery thereof from the accumulator.

The disclosed illumination installation can compensate for time-of-day- or time-of-year-related reduced yields of the wind or solar modules of the individual illumination devices by creating an intelligent auxiliary and charging system for the lights. A single, self-sufficiently travelling robot can equally well recharge a multiplicity of lights, distributing the installation and maintenance costs of the central infrastructure comprising the charging station and robot over a multiplicity of lights. As a result, this makes it possible to combine the small initial installation costs of a wind or solar light installation with the reliability of conventional wired lighting installations. Thus, the small infrastructure costs of the disclosed illumination installation allow large-area use even in areas with little or only occasional wind or with little or strongly fluctuating solar radiation or wind and in areas where the sun is shaded due to buildings or vegetation. Even rising energy demand of the illumination devices over the years, due for example to subsequent installation of additional energy users on the pole or due to aging of the lights, can be compensated for without having to replace the installed wind or solar modules by ones that are more powerful. Another advantage is that the capacity of the buffer batteries can be clearly reduced, since multi-day autonomy of the illumination devices is no longer required, if the robot recharges once a day, for example. Thus, one-day energy autonomy is sufficient, which leads to substantial cost saving due to smaller buffer batteries.

The robot can travel to the individual illumination devices on the route network according to a defined travel pattern or schedule, for example, and recharge their buffer batteries according to their charge level. An alternative embodiment of the disclosed subject matter is characterised in that each illumination device has a monitoring circuit for the charging condition of the buffer battery, that is equipped with a transmitter, and is configured to broadcast, at a low charging condition, a request signal via the transmitter. According to a first variant of the disclosed subject matter, such a request signal can be broadcast directly to the robot. In this case, the robot has a receiver and is configured to approach and charge, upon receipt of the request signal, the broadcasting illumination device. In an alternative variant, the request signal can be received by the charging station, which has a receiver and is configured to send, upon receipt of a request signal, the robot to the broadcasting illumination device for charging the same. In each case, this can minimize the trips of the robot and individually adapt them to the charging needs of the individual illumination devices.

The request signal can either itself include the position of the broadcasting illumination device, so that the robot knows where it should travel, or the request signal includes only an identifier of the illumination device, and the installation, e.g., the charging station or the robot, comprises a memory with identifiers and related positions of illumination devices, it being possible to query this memory for the position of the illumination device related to a received identifier, to make the robot travel there.

The disclosed illumination installation is suitable for installation in all types of route networks, be they overland, water, or even air route networks. According to a first embodiment of the disclosed subject matter, which is suitable for equipping parts of cities, villages, parks, etc., the route network is an overland route network and the robot is an unmanned land craft.

In an alternative embodiment, which is suitable for equipping shoreline walkways, harbours, etc., the route network is a water route network and the robot is an unmanned watercraft.

In both variants, each illumination device optionally has a pole, at the lower end of which the charging input is located and at the upper end of which the light is located, so that the land craft or watercraft can easily reach the charging input from the edge of the road or water.

In another alternative variant, which is also suitable for equipping areas with poor road access, the route network is an air route network and the robot is an unmanned areal vehicle (UAV). To be suitable for this, each illumination device optionally has a pole, at the upper end of which the charging input is located, so that it is easily accessible for the UAV robot.

In each of these embodiments, the poles of the illumination devices can also be used to carry further electricity fed equipments, such as optical or acoustical signalling equipment, radio transceivers or radio routers, also allowing the set up of a wireless signal or radio infrastructure for the environment, for example.

BRIEF DESCRIPTION OF THE DRAWINGS

The disclosed subject matter is explained in detail below using sample embodiments that are illustrated in the attached drawings. The drawings are as follows.

DETAILED DESCRIPTION

Figure 1:
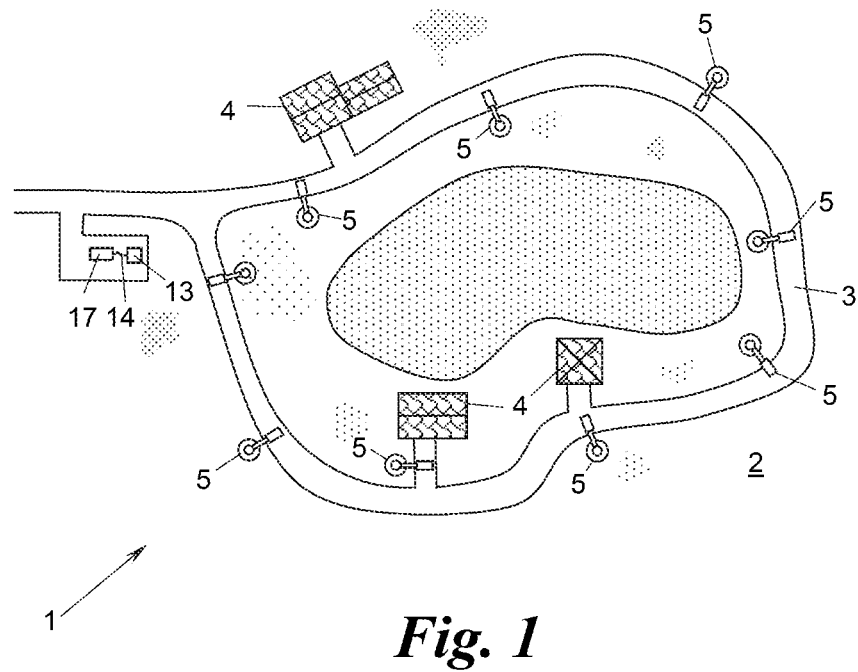
FIG. 1 is a schematic top view of the disclosed installation installed in a sample environment.
Figure 2:
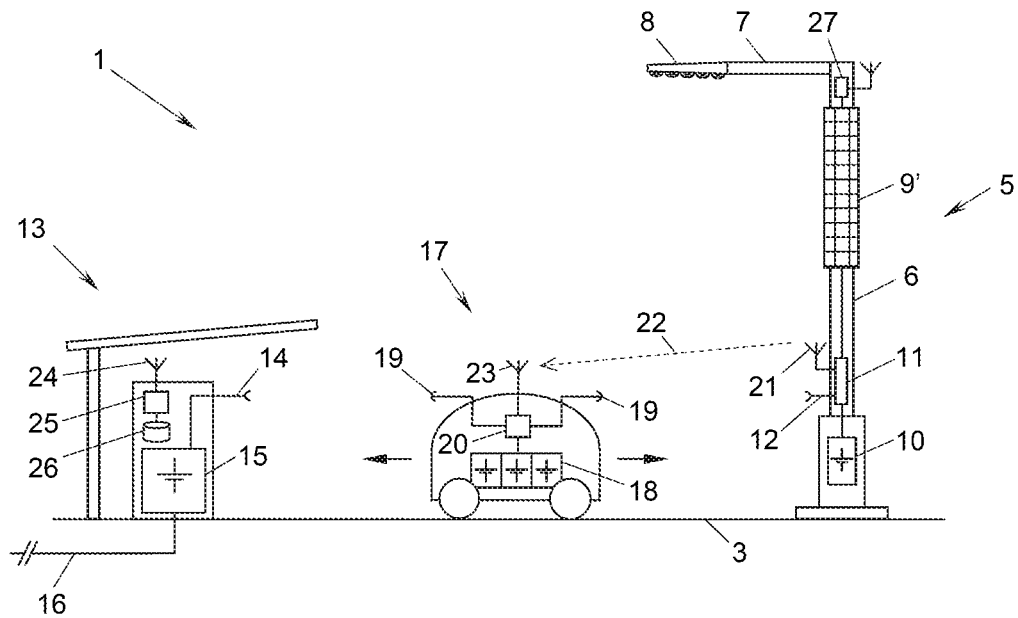
FIG. 2 through 4 are schematic side views of various embodiments of the disclosed installation.

FIG. 1 shows an illumination installation 1 for illuminating an environment 2, here a park, with a route network 3, buildings 4, and a pond, the installation 1 consisting of multiple components. The installation 1 comprises as its first component a multiplicity of illumination devices 5, which in order to illuminate the environment 2 are arranged distributed in it, e.g., along the route network 3 to illuminate the route network 3. FIG. 2 shows a representative one of these illumination devices 5 in detail.

According to FIG. 2, each illumination device ("wind or solar light") 5 comprises a pole 6, which carries, at its upper end, a light 8 on an arm 7, and which is equipped with a solar module 9' (FIG. 2, 4) and/or a wind module 9" (FIG. 3) to generate solar and/or wind electricity, which feed(s) the light 8. The wind and/or solar electricity that is generated by the wind or solar module 9', 9" and that feeds the light 8 can be buffered in a buffer battery 10 of the illumination device 5, for example to store the solar electricity generated during the day for the night hours or to store the wind electricity generated when there is wind for use when there is no wind. An electronic circuit 11 controls the charging of the buffer battery 10 by the wind or solar module 9', 9" and the feeding of the light 8 from the wind or solar module 9', 9" and/or from the buffer battery 10. A charging input 12 at the lower end of the pole 6 allows the buffer battery 10 also to be externally charged, as will be explained in greater detail below.

Figure 3:
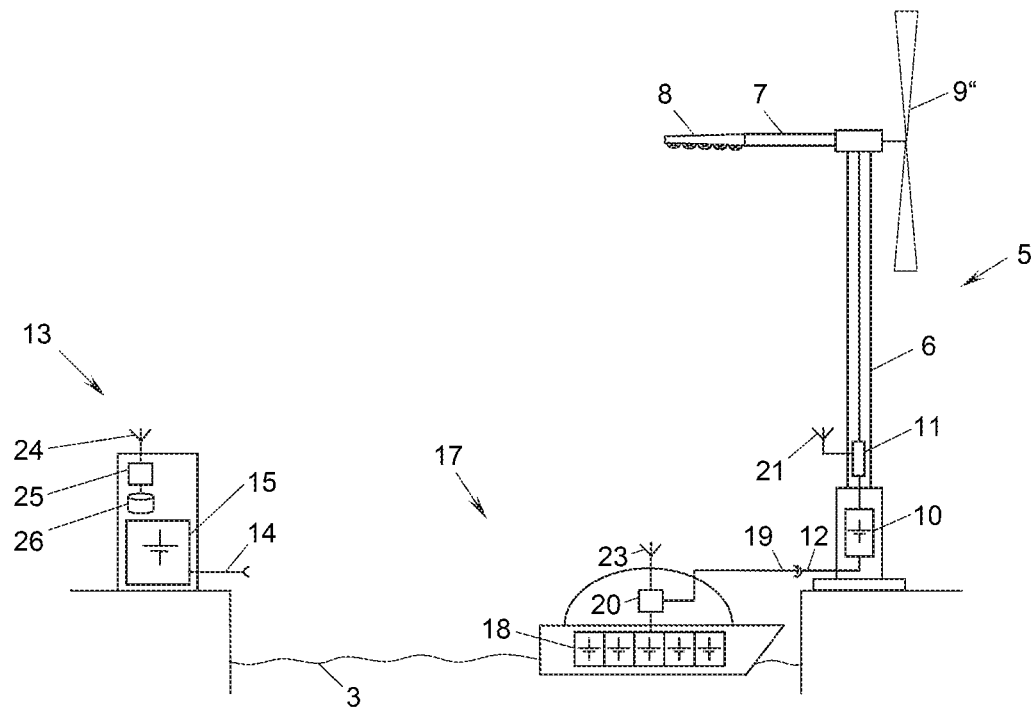

The solar module 9' used can be any photovoltaic module known in the art that converts incident (sun)light into electricity ("solar electricity"). The solar modules 9' can be mounted both on the side of the pole 6 or around it, e.g., in the form of a sleeve, as shown, or also in the form of flat panels at the upper end of the pole 6, or on its arm 7. If the illumination device 5 has, alternatively to or in addition to the solar module 9', a wind module 9" to generate wind electricity, it is possible to use for this purpose every type of wind turbine known in the art, as is schematically illustrated in FIG. 3.

Returning to FIG. 1, the installation 1 comprises as its second component a common charging station 13 for the entire group of illumination devices 5 of the environment 2.

The charging station 13 is connected with the illumination devices 5 through the route network 3. As is shown in FIG. 2, the charging station 13 has a charging output 14 for outputting charging electricity, which is fed from a source of electricity 15 of the charging station 13. The source of electricity 15 can be of any type, for example a battery, an internal combustion electric generator, and/or a connection 16 to the public power grid.

According to FIGS. 1 and 2, the installation 1 comprises as its third component a robot 17 which travels self-sufficiently on the route network 3 and which shuttles between the charging station 13 and the illumination devices 5, to charge up or recharge the latter. To accomplish this, the robot 17 has an internal accumulator 18 and at least one charging coupler 19, with which it connects, in a first position (FIG. 1), to the charging output 14 of the charging station 13 and buffers the charging electricity thereof in its accumulator 18. When the accumulator 18 is charged up, the robot 17 leaves the charging station 13, connects with its charging coupler 19 to the charging input 12 of one of the illumination devices 5 and in this second position (FIG. 3) charges up or recharges the buffer battery 10 of the illumination device 5 from its accumulator 18. An electronic circuit 20 of the robot 17 controls both the charging up of the accumulator 18 in the charging station 13 and also the output of the charging electricity from the accumulator 18 to the illumination device 5.

The charging coupler 19 can be attached, for example, to a swing-out or extendable charging arm of the robot 17. This allows the robot 17 to reach even difficult-to-reach charging inputs 12 of illumination devices 5, which are located, for example, some meters off the side of the route network 3, or in order to be able to get across, e.g., snowdrifts. Using such a swing-out or extendable charging coupler 19 also optionally allows the charging inputs 12 of illumination devices 5 to be situated higher on the pole 6, to make tampering more difficult. However, each of the charging inputs 12 can also be installed separately from the pole 6 and be connected with the pole 6 through a cable, possibly to make them easier for the robot 17 to reach.

On the route network 13, the robot 17 travels completely self-sufficiently, as is known in the field of robot lawn mowers, robot vacuum cleaners, or self-driving cars. To accomplish this, it is possible to use all self-driving technologies known in the art, e.g., self-localization and self-control by means of satellite navigation and, stored in the circuit 20, a digital road network including the positions of the charging station 13 and the illumination devices 5. Alternatively or additionally, it is possible to use positioning beacons or support beacons along the route network 3, which guide the robot 17, for example by means of optical or radio guidance signals. It is also possible to use buried induction loops, guide antennae, etc., to guide the robot 17 to and from the charging station 13 and the illumination devices 5.

The travel pattern of the robot 17 is selected according to the capacity of its accumulator 18 and the need for charging electricity of the illumination devices 5. For example, the robot 17 can return back to the charging station 13 to charge itself up whenever it has finished charging up an illumination device 5, or it can approach and charge up multiple charging devices one after the other, before it returns to the charging station 13 to charge itself back up.

The robot 17 can travel a defined route on the route network 3 and charge up every illumination device 5 that it encounters on the route. However, alternatively the illumination devices 5 can also individually signal their charging need to the robot 17 or to the charging station 13, as is explained below.

To accomplish this, every illumination device 5 is optionally equipped with a transmitter 21 that is connected to the circuit 11, and the circuit 11 monitors the charging condition of the buffer battery 10. When the charging condition falls below a defined threshold, the circuit 11 causes the transmitter 21 to broadcast a request signal 22.

In a first embodiment, the request signal 22 can be directly received by a receiver 23 of the robot 17, and this request signal 22 causes the robot 17—through its electronic circuit 20—to approach and charge it up the illumination device 5 that is (or was) broadcasting.

In an alternative embodiment, the request signal 22 can be received by a receiver 24 of the charging station 13, and the charging station 13 is programmed to send the robot 17 to the illumination device 5 that is (or was) broadcasting, to charge it up. For example, the charging station 13 can communicate, via radio or via the charging output 14, the position and the charging need of the illumination device 5 to the robot 17 as the next goal of its charging trip.

An example of a simple variant when the request signal 22 is received directly by the robot 17 is for the robot 17 only to head for the broadcasting site of the signal, and in this way to find the broadcasting illumination device 5 which needs charging. However, optionally the request signal 22 is a data packet that includes a unique identifier of the illumination device 5 of the installation 1, and the installation 1 includes a memory 26 with an assignment table of identifiers of illumination devices 5, on the one hand, and, on the other hand, related positions of illumination devices 5, this table being arranged, for example, in the charging station 13. Upon receipt of the request signal 22 in the charging station 13, the circuit 25 of the charging station 13 queries the memory 26 for the position of the broadcasting illumination device 5 related to the received identifier, and broadcasts this position to the robot 17 as described. Alternatively, the memory 26 with the assignment table can also be arranged directly in the robot 17, so that the robot 17 can, upon receipt of the request signal 22, determine the position of the illumination device 5 from its identifier, in order to approach it.

Alternatively, the request signal 22 can also directly indicate the position of the illumination device 5, so that the memory 26 with the assignment table can be eliminated.

FIGS. 1 and 2 show an overland route network as an example of a route network 3, and the robot 17 is a land craft. FIG. 3 shows an alternative embodiment of the installation 1, wherein the route network 3—only schematically illustrated here—is in the form of a water route network and the robot 17 is in the form of an unmanned watercraft. Here the illumination devices 5 are arranged on the bank of the water route network 3 and their charging inputs 12 are located at the lower end of the pole 6, so that they can easily be reached from the watercraft robot 17 by means of a charging coupler 19 protruding from it.

FIG. 2 also shows the optional use of the poles 6 of the illumination devices 5 to support further equipments 27, which can be fed with the battery-buffered wind or solar electricity from the wind or solar module 9', 9", such as optical or acoustical signalling equipment, radio transceivers or radio routers 27, e.g., a WiFi hotspot, surveillance cameras, environmental sensors, road signs, traffic information systems, cell phone charging stations, illuminated billboards, or similar things.

Figure 4:
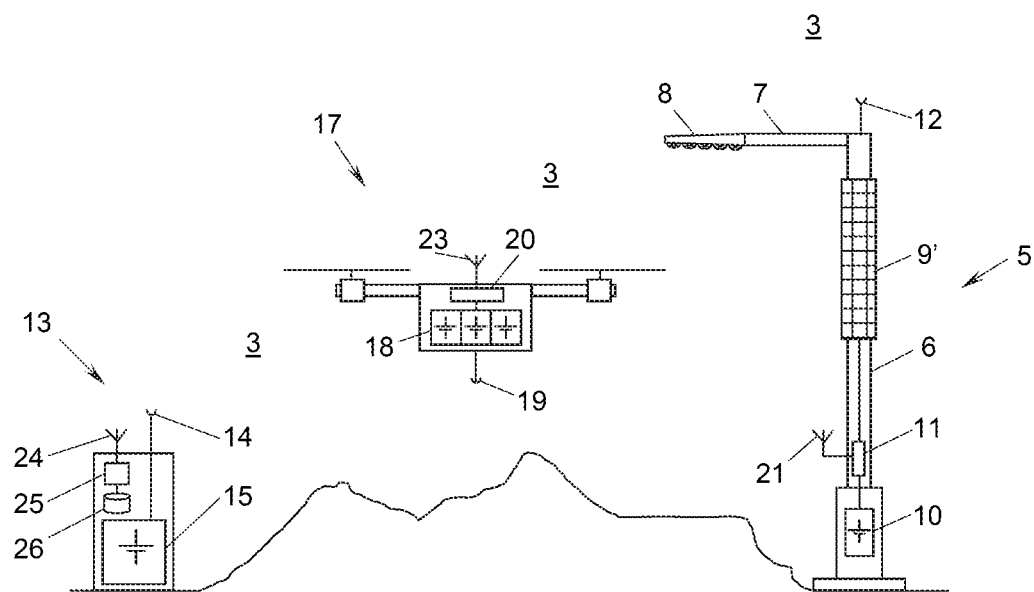

FIG. 4 shows another embodiment of the installation 1, in which the route network 3 is an air route network and the robot 17 in the form of an unmanned aircraft (unmanned areal vehicle, UAV). This embodiment is suitable especially for installation of illumination devices 5 in an environment 2 with poor road access and also not opened up by waterways. Here the illumination devices 5 carry their charging inputs 12 at the upper end of the pole 6, so that the robot 17 in the form of a UAV can reach the charging input 12 from the air with its charging coupler 19. The charging output 14 of the charging station 13 is optionally also arranged on its top, to allow simple connection of the UAV robot 17.

In every one of the embodiments mentioned, the robot 17 can also be equipped with mechanical or electronic equipment to open doors and gates, to allow it to approach, e.g., fenced-in areas such as off-leash dog areas, children's playgrounds, and similar things.

Optionally, the robot 17 can also charge itself up when connected to an illumination device 5, if the illumination device 5 has an excess of energy in its buffer battery 10. To accomplish this, the circuit 11 of the illumination device 5 can correspondingly communicate with the circuit 20 of the robot 17, for example through the transmitter 21 and receiver 23 or through a wired data connection, when the robot 17 connects to the illumination device 5, to control the charging up of the buffer battery 10 or the output of a possible excess of energy to the accumulator 18. Each of the circuits 11, 20, 25 of charging station 13, robot 17, and illumination device 5, which are involved in the control of charging up of the accumulator 18 and the buffer batteries 10, can also be designed for a quick charge function.

The disclosed subject matter is not limited to the presented embodiments, but rather comprises all variants, modifications, and combinations that fall within the scope of the associated claims.

What is claimed is:

1. An installation for illuminating an environment, comprising:
    a multiplicity of illumination devices which are distributed in the environment and approachable via a route network, wherein each illumination device has a light, a wind and/or solar module for respective generation of wind or solar electricity feeding the light, a buffer battery for respectively buffering the wind or solar electricity, and a charging input for charging the buffer battery;
    a common charging station for the illumination devices, which is approachable via the route network and has a charging output for outputting charging electricity; and
    a robot which travels self-sufficiently on the route network, has an accumulator and shuttles between a first position, in which it connects to the charging output of the charging station and buffers the charging electricity thereof in the accumulator, and multiple second positions, in each of which it connects to the charging input of one of the multiplicity of illumination devices and charges the buffer battery thereof from the accumulator.

2. The installation according to claim 1, wherein each illumination device has a monitoring circuit for the charging condition of the buffer battery, that is equipped with a transmitter, and is configured to broadcast, at a low charging condition, a request signal via the transmitter.

3. The installation according to claim 2, wherein the robot has a receiver and is configured to approach and charge, upon receipt of the request signal, the broadcasting illumination device.

4. The installation according to claim 2, wherein the charging station has a receiver and is configured to send, upon receipt of the request signal, the robot to the broadcasting illumination device for charging the same.

5. The installation according to claim 2, wherein the request signal includes the position of the illumination device.

6. The installation according to claim 2, wherein the request signal includes an identifier of the illumination device and the installation comprises a memory with identifiers and related positions of illumination devices.

7. The installation according to claim 1, wherein the route network is an overland route network and the robot is an unmanned land craft.

8. The installation according to claim 1, wherein the route network is a water route network and the robot is an unmanned watercraft.

9. The installation according to claim 7 wherein each illumination device has a pole, at the lower end of which the charging input is located and at the upper end of which the light is located.

10. The installation according to claim 1, wherein the route network is an air route network and the robot is an unmanned aircraft.

11. The installation according to claim 10, wherein each illumination device has a pole, at the upper end of which the charging input is located.

12. The installation according to claim 9, wherein the pole carries at least one of an electricity fed equipment, an optical signalling equipment, an acoustical signalling equipment, a radio transceiver, and a radio router.

13. The installation according to claim 8, wherein each illumination device has a pole, at the lower end of which the charging input is located and at the upper end of which the light is located.

14. The installation according to claim 11, wherein the pole carries at least one of an electricity fed equipment, an optical signalling equipment, an acoustical signalling equipment, a radio transceiver, and a radio router.

* * * * *